(12) United States Patent
Schulz

(10) Patent No.: US 9,125,346 B2
(45) Date of Patent: Sep. 8, 2015

(54) COMBINE HARVESTER

(75) Inventor: Waldemar Schulz, Osnabrueck (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 677 days.

(21) Appl. No.: 13/323,220

(22) Filed: Dec. 12, 2011

(65) Prior Publication Data

US 2012/0184339 A1 Jul. 19, 2012

(30) Foreign Application Priority Data

Jan. 14, 2011 (DE) .......................... 10 2011 000 130

(51) Int. Cl.
*A01F 12/44* (2006.01)
*A01D 75/28* (2006.01)

(52) U.S. Cl.
CPC ............ *A01F 12/444* (2013.01); *A01D 75/282* (2013.01)

(58) Field of Classification Search
CPC ...... A01F 12/444; A01F 12/48; A01D 75/282
USPC ............. 460/78, 99, 100, 143, 901, 902, 119; 209/318
See application file for complete search history.

(56) References Cited

U.S. PATENT DOCUMENTS

| | | | | |
|---|---|---|---|---|
| 807,978 | A * | 12/1905 | Walch | 460/80 |
| 820,816 | A * | 5/1906 | McRae | 460/1 |
| 833,700 | A * | 10/1906 | Still | 209/318 |
| 1,112,848 | A * | 10/1914 | Seagreen | 460/92 |
| 2,589,440 | A * | 3/1952 | Sharpe | 460/100 |
| 2,674,374 | A * | 4/1954 | Allen et al. | 209/136 |
| 2,694,493 | A * | 11/1954 | Odegarden | 209/261 |
| 2,750,037 | A * | 6/1956 | Taylor | 209/261 |
| 2,849,118 | A * | 8/1958 | Ashton | 209/318 |
| 2,954,123 | A * | 9/1960 | Gaunt et al. | 209/21 |
| 3,049,128 | A * | 8/1962 | Mark et al. | 460/85 |
| 3,374,886 | A * | 3/1968 | Lightsey | 209/28 |
| 3,456,652 | A * | 7/1969 | Sietmann et al. | 460/8 |
| 3,495,598 | A * | 2/1970 | Sietmann et al. | 460/99 |
| 3,509,885 | A * | 5/1970 | Sietmann et al. | 460/100 |
| 3,813,184 | A * | 5/1974 | Temple et al. | 415/53.3 |
| 3,910,285 | A * | 10/1975 | Sietmann | 460/1 |
| 4,265,077 | A * | 5/1981 | Peters | 56/14.6 |
| 4,303,079 | A * | 12/1981 | Claas et al. | 460/99 |
| 4,397,319 | A * | 8/1983 | Schuhmacher | 460/99 |
| 4,412,549 | A * | 11/1983 | Rowland-Hill | 460/100 |
| 4,466,230 | A * | 8/1984 | Osselaere et al. | 460/5 |
| 5,624,315 | A * | 4/1997 | Jonckheere | 460/99 |
| 6,558,252 | B2 * | 5/2003 | Visagie et al. | 460/99 |
| 6,899,617 | B2 * | 5/2005 | Sahr et al. | 460/114 |
| 7,416,482 | B2 * | 8/2008 | Weichholdt | 460/99 |
| 7,645,190 | B2 * | 1/2010 | Schwinn et al. | 460/6 |
| 7,841,931 | B2 * | 11/2010 | Straeter | 460/101 |

(Continued)

FOREIGN PATENT DOCUMENTS

DE 39 06 186 8/1990

*Primary Examiner* — Thomas B Will
*Assistant Examiner* — Joan D Misa
(74) *Attorney, Agent, or Firm* — Michael J. Striker

(57) ABSTRACT

A combine harvester has a cutting and conveyance device for crop, a threshing device for separating grain from the crop, a sieve system arranged in the longitudinal direction of the combine harvester, and a blower system comprising at least two blowers disposed upstream of the sieve system transversely to the longitudinal direction of the combine harvester and controlled independently of one another.

14 Claims, 5 Drawing Sheets

(56) References Cited

U.S. PATENT DOCUMENTS

| | | | |
|---|---|---|---|
| 7,992,370 B2 * | 8/2011 | Sheidler et al. | 56/10.7 |
| 8,626,400 B2 * | 1/2014 | Sheidler et al. | 701/50 |
| 2008/0234019 A1 * | 9/2008 | Teroerde et al. | 460/100 |
| 2009/0163260 A1 * | 6/2009 | Claes | 460/100 |

* cited by examiner

COMBINE HARVESTER

CROSS-REFERENCE TO RELATED APPLICATION

The invention described and claimed hereinbelow is also described in German Patent Application DE 10 2011 000 130.1 filed on Jan. 14, 2011. This German Patent Application, whose subject matter is incorporated here by reference, provides the basis for a claim of priority of invention under 35 U.S.C. 119(a)-(d).

BACKGROUND OF THE INVENTION

The present invention relates to a combine harvester. More particularly, it relates to a combine harvester having a cutting and conveyance device for crop, a threshing device for separating grain from the crop, a sieve system, and a blower system.

DE 39 06 186 A1 makes known a combine harvester of the initially stated type, which comprises a cutting and conveyance device for crop, a threshing unit for separating the grain from the crop, and a sieve system extending in the longitudinal direction of the combine harvester. A blower system is disposed upstream of the sieve system, transversely to the longitudinal direction of the combine harvester. Crop that is picked up by the cutting and conveyance device and conveyed to the combine harvester is directed to the threshing device to separate grain from the crop. The threshing device separates a large portion of the grain from the crop. The remaining crop, which comprises mainly straw and chaff, is transferred to the sieve system in order to separate out the portion of grain remaining in the crop. The blower system disposed upstream of the sieve system in the transverse direction of the combine harvester generates an air volume flow to act upon the sieve system with air, thereby assisting in the separation of heavy grains from the lighter-weight components of the crop, such as chaff and straw. The efficiency of the separation is dependent upon the consistency of the supply of the crop to the sieve system. The consistency of the supply is greatly affected when the combine harvester is in a tilted position since gravity causes crop to accumulate on the sieve system.

DE 39 06 186 A1 provides a blower system comprising a cross-flow fan which extends in the direction of travel across the entire width of the sieve system. The cross-flow fan is segmented by partition walls in order to attain a number of sectors that corresponds to the number of sieve sections of the sieve system, which are acted upon by air by the cross-flow fan. To balance the uneven crop distribution that occurs when the combine harvester is in a tilted position, the blower speed is changed in accordance with the slant.

A proven disadvantage of this blower system is that changing the blower speed has the same effect across the entire width of the sieve system. The cleaning output during the harvesting operation on the slope is clearly impaired despite a constant flow across the width of the sieve system at low throughput rates, and therefore, due to the force of gravity, the bulk phase dominates in the crop on the downhill section of the sieve system, while the flight phase dominates on the uphill section of the sieve system.

SUMMARY OF THE INVENTION

The problem addressed by the present invention is that of providing a combine harvester, in which a consistent fluidized-bed phase forms across the entire width of the sieve system.

According to the present invention, the blowers can be controlled independently of one another. The independent control of the air volume flow output by the particular blower makes it possible to vary, in a flexible manner, the air volume flow supplied to the sieve system, in order to maintain the fluidized-bed phase across the entire width of the sieve system under varying harvesting and/or operating conditions. By way of the means, an air volume flow adapted to the harvesting conditions is generated, which can vary across the width of the sieve system. It is therefore possible, for example, to compensate an uneven formation of various separation states occurring on a slope, which is induced by the bulk phase which dominates on the downhill section of the sieve system due to gravity, and the flight phase which dominates on the uphill section of the sieve system. Likewise, the effects of an uneven distribution of crop across the width of the separating devices can be compensated.

To this end, the blowers can be controlled as a function of at least one operating parameter and/or crop parameter.

A control device for controlling the blowers is provided, which is operatively connected to a sensor system for registering operating parameters and/or crop parameters.

Preferably, the blowers can be controlled such that the flow velocity of the particular air volume flows differs across the width of the sieve system. To this end, the blowers can be controlled such that the particular air volume flows are adapted depending on the distribution of crop on the sieve system. In this manner, it is possible to react to an uneven distribution of crop across the width of the sieve system that may occur in such a manner that a local accumulation of crop on the sieve system, which is induced e.g. by a slope or an uneven supply of crop by the upstream working devices, results in an individual control of the blower that acts upon this region with an air volume flow in order to convey the air volume flow with a flow velocity that is greater than in the adjacent regions.

Furthermore, the blowers can be controlled individually depending on the distribution of layer thickness. Since the distribution of layer thickness remains approximately the same during the entire process of handling crop in the combine harvester, an inconsistency in the layer thickness of the crop flow in the intake and/or threshing region continues until the cleaning device is reached. This unevenness of distribution in the crop flow can be compensated by way of the individual controllability of the air volume flow depending on the layer thickness distribution.

Alternatively or in addition thereto, the blowers can be controlled individually depending on a lateral slant of the combine harvester, which is detected by a sensor system. To this end, an inclinometer can be used as the sensor, for example, which is connected to a control device. The control device evaluates the measurement signal of the inclinometer and provides a control signal depending on the measurement signal, in order to control the particular blower accordingly.

In a preferred development, the generated air volume flow of each blower can be controlled individually depending on an air pressure registered by a pressure measuring device underneath the cleaning device.

Furthermore, the blowers can be controlled depending on at least one operating parameter which is dependent upon throughput. In particular, the blowers can be controlled individually depending on cleaning losses. To this end, the speeds of each blower in the blower system can be controlled individually in accordance with a specification of a maximum value for loss due to cleaning. The actual losses due to cleaning that occur are registered by a suitable sensor system and are compared by a control device with the default values for the losses due to cleaning, in order to derive, on the basis of the comparison, appropriate speed changes for the particular blowers.

Preferably, the blower system can comprise at least two blowers which are driven by a single motor. A main advantage is that the blower system can be driven in a more energy-efficient manner when the blowers can be controlled or regulated individually and in a manner oriented to the existing harvesting and/or operating conditions.

Preferably, the single-motor drives can be disposed in pairs between the blowers or, alternatively, can be separated from one another by the blowers.

In particular, the single-motor drives can be in the form of electric motors. The use of electric motors simplifies the speed adjustment of the blowers since mechanical means such as transmissions for speed adjustment can be omitted.

Advantageously, the electric motors can be in the form of external rotor motors which are a component of the fans. The particular electric motor is integrated in the blower in order to drive the fan wheels thereof directly. It is therefore possible to drive the particular blower individually and reduce installation space.

In particular, frequency converters can be provided to control the electric motors, by way of which the speed of the individual blowers can be easily adapted independently of one another.

In a preferred development, the means can be in the form of orifices having an adjustable opening width at inlet openings of the blower. To this end, sheet metal pieces which are displaceable in the radial direction can be disposed at the inlet openings of each blower to provide partial closing thereof. According to a simplified embodiment, two sheet metal pieces are provided, which are disposed on the blower housing in a manner that permits swivelling about an axis which is axially parallel to the blower. The two sheet metal pieces are moved toward one another to reduce the opening width of the inlet openings. In a further embodiment, an iris diaphragm is provided, by way of which the opening width can be changed. The iris diaphragm has the advantage that the air volume flow that can be drawn in can be controlled exactly. The orifices are provided with actuators which make it possible to control the orifices to vary the opening width and, therefore, the air volume flow that can be output by the particular blower. The control or regulation of the actuators, by way of which the orifices can be actuated, can take place in the manner described above depending on a crop and/or operating parameter.

Alternatively or in addition thereto, the means can be in the form of orifices having an adjustable opening width at the outlet openings of the particular blower. Preferably, throttle valves can be used in the particular outlet openings, which can likewise be actuated using a suitable sensor system to enable individual control of the air volume flow emerging from the particular blower.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
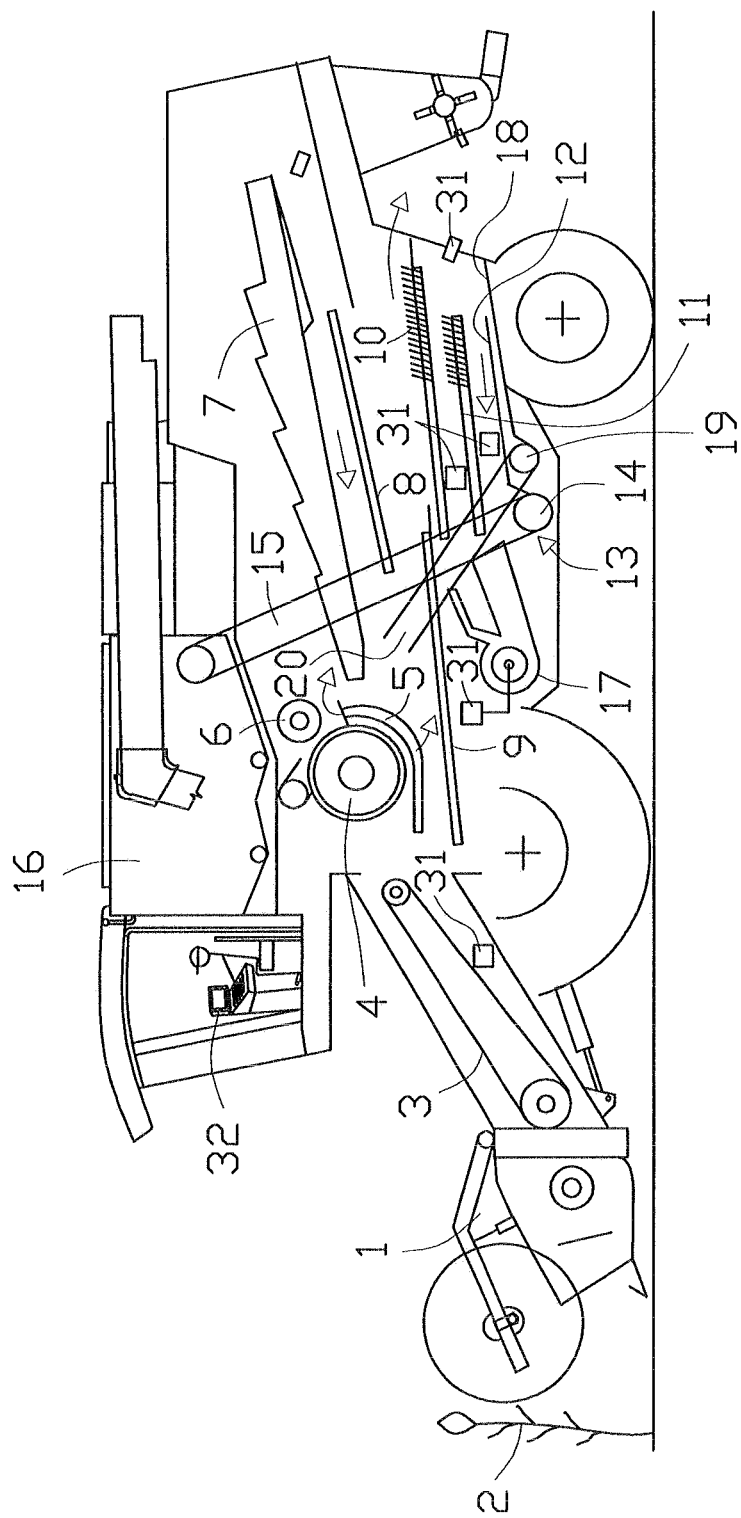
FIG. 1 a schematic sectional view of a combine harvester in accordance with the present invention.

The combine harvester depicted schematically in FIG. 1 carries, on the front side thereof, a replaceable front attachment 1 such as a grain-cutting device for cutting and collecting crop 2. A feed rake 3 conveys the cut crop 2 to a threshing device oriented transversely to the direction of travel of the combine harvester, comprising a cylinder 4 and a concave 5. Grain threshed out of the crop 2 passes through the concave 5. An impeller 6 serves to further convey the threshed crop to a separating device 7 depicted here as a straw walker, which removes the remaining grain and small pieces of non-grain material from the flow of the threshed crop. Instead of the straw walker, an axial separator can be provided as the separating device 7, e.g. comprising one or two rotors extending in the longitudinal direction of the combine harvester, which are enclosed by separating grates.

Crop that has fallen through grates of the separating device 7 lands on a return pan 8 which extends below the separating device 7 and slants toward the front and, by way thereof, to a grain pan 9 on which it is combined with grain that has been separated directly at the cylinder 4 and passed through the concave 5. The resulting crop flow, which is rich in grain but also contains finely fragmentized non-grain components, is conveyed further on an upper sieve 10 of a sieve system.

The upper sieve 10 and a lower sieve 11, which is located therebelow and is disposed approximately parallel to the upper sieve 10, are enclosed by a sieve housing at the bottom and the sides, and are likewise components of the sieve system. The lower sieve 11 and the upper sieve 10, which are located in the sieve housing, are components of a cleaning device of the combine harvester for separating grain from non-grain components in the crop flow. The floor 12 of the sieve housing, which is shown in FIG. 1, slants starting at an edge adjacent to a rear edge of the lower sieve 11 toward the front to an auger trough 13 in which a conveyor auger 14 rotates. The conveyor auger 14 and a grain elevator 15 connected thereto convey grain cleaned of non-grain components which collects on floor 12 into a grain tank 16 behind the driver's cab of the combine harvester.

A blower system 17 is disposed upstream of the upper sieve and lower sieve 10, 11 in order to deliver an air volume flow that flows partially through and partially past the sieves 10, 11 in order to lift and carry away lightweight components of the crop located on the sieves 10, 11. Components that are carried away by the air volume flow past a rear edge of the upper sieve 10 are ejected directly out of the combine harvester, as indicated by an arrow in FIG. 1. Components that have passed through the upper sieve 10 and reached the lower sieve 11 where they are carried away by the air volume flow are often ear fragments that have not been completely threshed. They drop past the rear edge of the lower sieve 11 onto a tailings floor 18, collect at the lower edge thereof at a second auger 19 and, by way thereof and an elevator 20, return to the cylinder 4.

Figure 2:
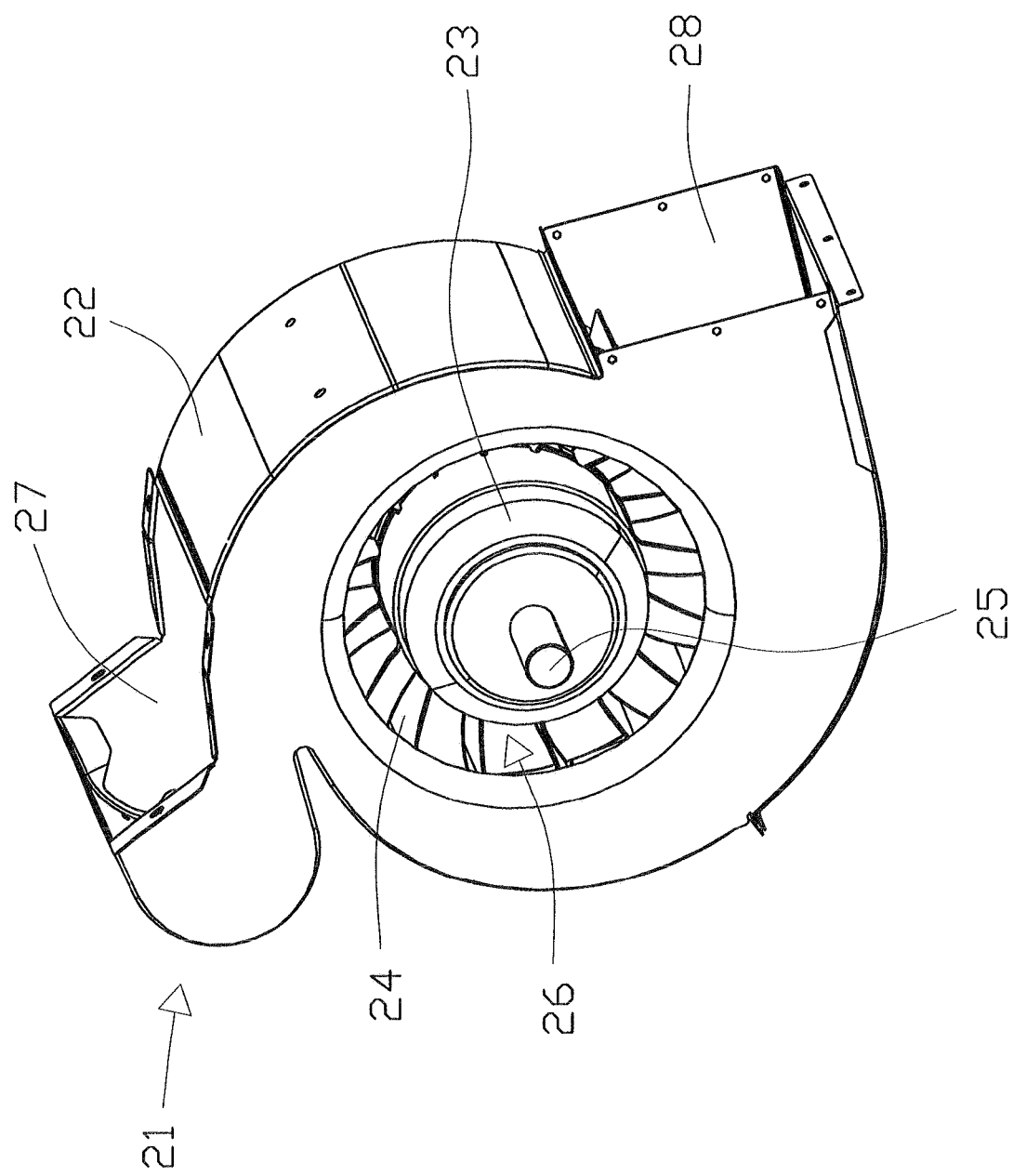
FIG. 2 a perspective view of a blower driven by a single motor in accordance with the present invention.

The depiction in FIG. 2 shows a blower 21 driven by a single motor, which is part of the blower system 17. In the embodiment shown, the blower 21 is disposed in a separate blower housing 22. The blower 21 draws in air through a radial inlet opening 26 in the side wall of the blower housing 22. The blower housing 22 comprises a first outlet opening 27 oriented substantially opposite the direction of travel of the combine harvester, which serves to direct an air volume flow into a secondary channel. Furthermore, the blower housing 22 comprises a second outlet opening 28 out of which an air volume flow to be directed to the sieves 10, 11 flows.

A control device 32 is provided in order to control the air volume flow output by the particular blower 21 independently of one another depending on at least one operating parameter and/or crop parameter. The control device 32 is operatively connected to a sensor system 31, by way of which the signals representing the operating parameters of the combine harvester are registered. The operating parameters can be, for instance, the speed of the blower 17, the layer thickness of the crop in the feeder housing, losses due to cleaning, and the like. The control device 32 evaluates these signals accordingly and generates control signals to control the actuator system of the combine harvester. Furthermore, the control device 32 comprises an input unit, by way of which the crop parameters such as the kind of crop, the current moisture level of the crop, and the like can be entered.

The embodiment of the blower 21 depicted in FIG. 2 comprises, as means for controlling the air volume flow depending on at least one operating parameter, a single-motor drive designed as an external rotor motor 23. A large number of fan wheels 24, which are part of the blower 21, are disposed on the rotor of the external rotor motor 23 which rotates about the stator mounted on a stationary shaft 25.

Figure 3:
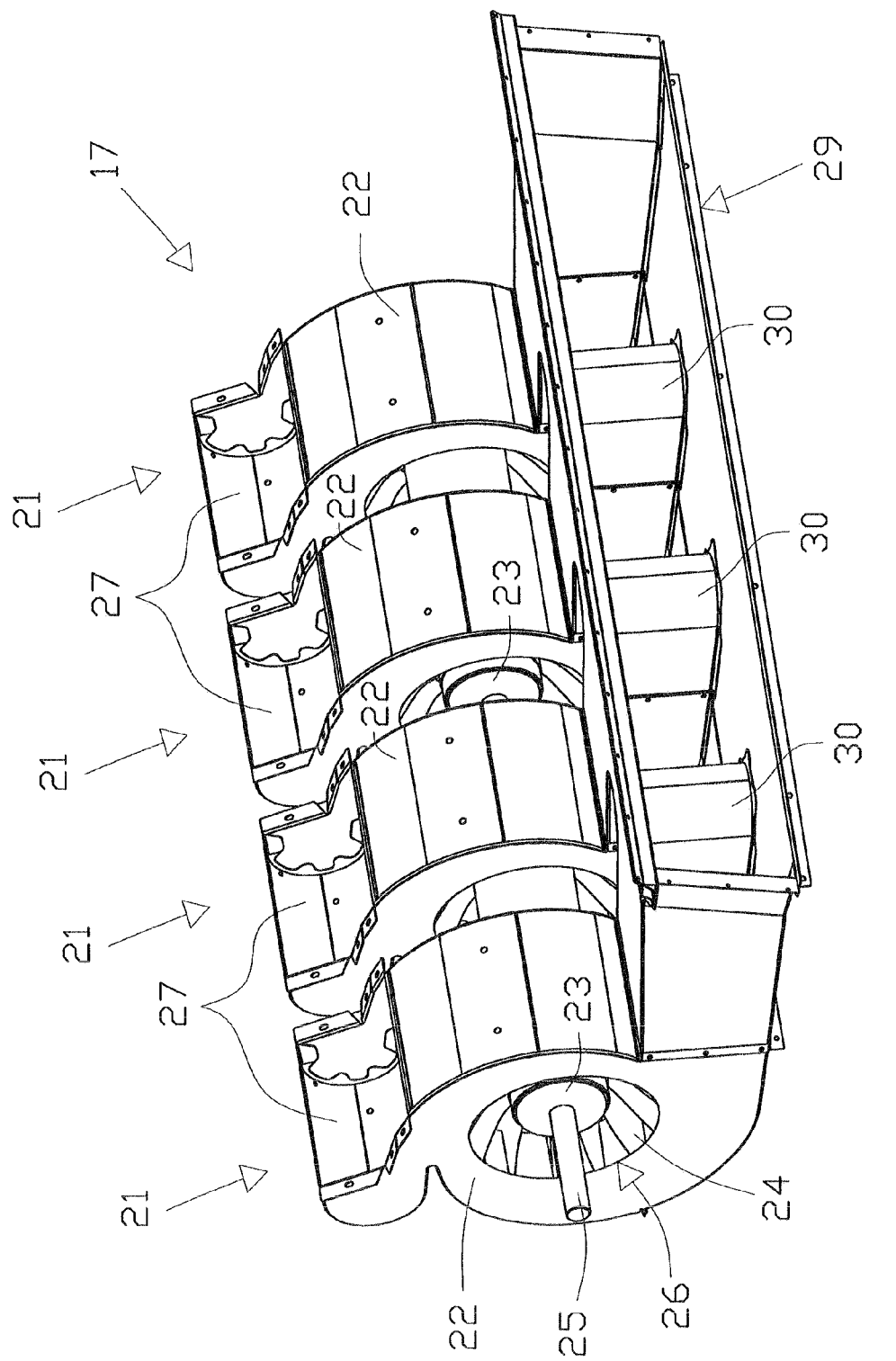
FIG. 3 a perspective view of a blower system of a combine harvester in accordance with the present invention.
Figure 4:
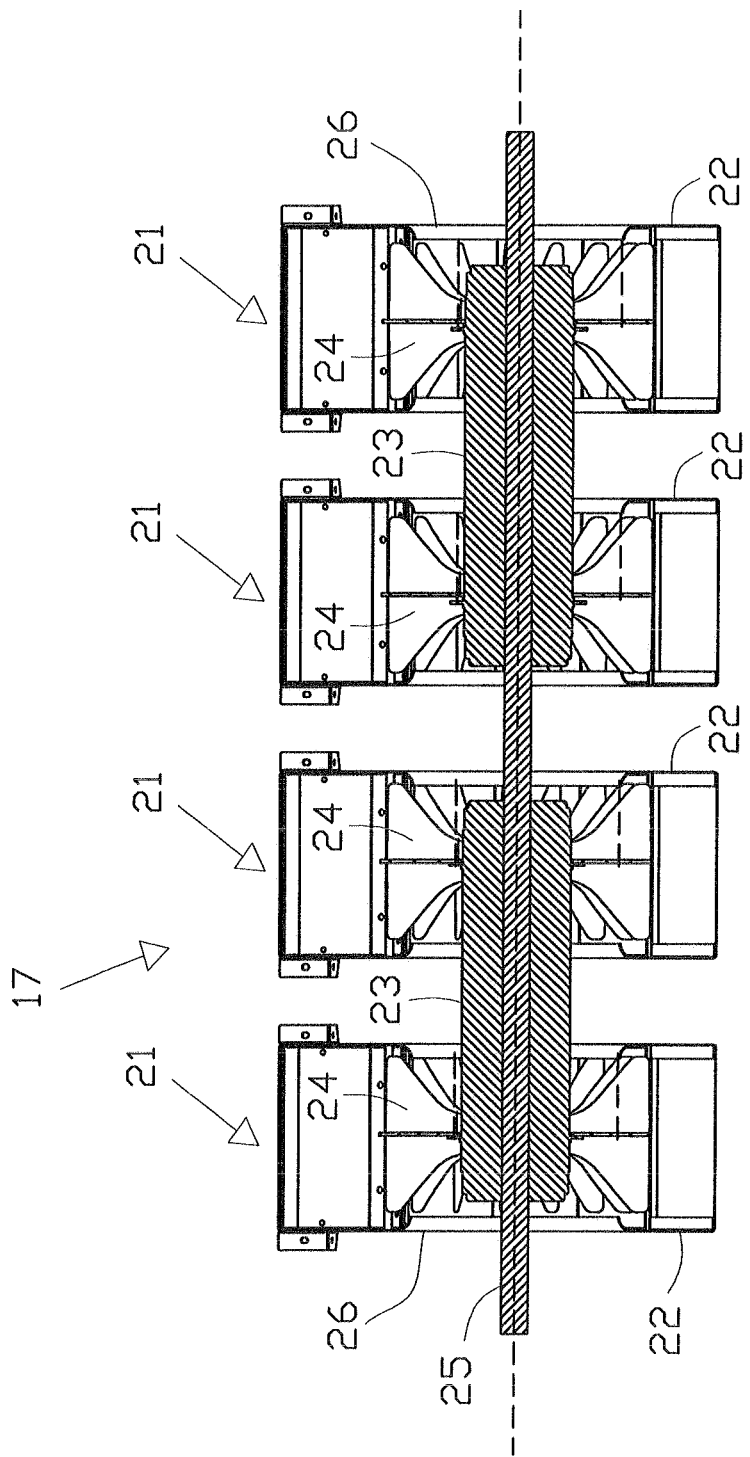
FIG. 4 a sectional view of the blower system according to FIG. 3 in accordance with the present invention.

FIG. 3 and FIG. 4 show a perspective view and an axial sectional view of a blower system 17 which comprises blowers 21 driven in pairs by a single motor. The blowers 21 are preferably disposed coaxially next to one another on a stationary shaft 25 extending across the width of the blower system 17. The second outlet opening 28 of the particular blower 21 leads into a main channel 29 which extends substantially across the extension of the sieve housing as viewed in the direction of travel of the combine harvester. The air volume flows provided individually by the blowers 21 are channeled by walls 30 located in the main channel 29. As shown in FIG. 4, the blowers are disposed coaxially relative to one another on the continuous, stationary shaft which forms the stator of the external rotor motors 23. According to the embodiment in FIG. 3 and FIG. 4, two blowers 21 are driven in each case by a common external rotor motor 23. According to alternative structural embodiments of the blower system 17, for example, the electric-motor drives are disposed between two blowers 21, or the particular electric-motor drives situated opposite one another are separated from one another by a blower pair 21 when the particular electric-motor drives are not designed as a component of the particular blower 21, but rather drive them by way of a separate shaft.

The blowers 21 and the drives 23 thereof can also be disposed in a common housing extending across the width of the blower system 17.

Every external rotor motor 23 is connected to a frequency converter which individually controls the drive speed of the external rotor motor 23. The setting of the speed of the particular blower 21 by the associated frequency converter can be controlled, e.g. depending on a longitudinal and/or transversal slant of the combine harvester, which is registered by a measuring device such as an inclinometer. According to a transverse slant which is detected, the speed of the blower 21 on the uphill side of the combine harvester would be reduced, while it would be increased on the downhill side in order to better process the greater crop flow which occurs there due to gravity.

An alternative control variable is the air pressure that develops underneath the cleaning device, which is registered by a sensor system 31 disposed underneath the cleaning device, in order to control the frequency converters individually depending on the measured values that are registered. The varying, inconsistent loading of the upper sieve and the lower sieve 10, 11 with crop across the width thereof results in different counterpressure conditions which are used as a control variable for the individual control of the blowers 21.

As a further embodiment for operating the blower system 17, the speeds of the blowers 21 can be controlled depending on the loss due to cleaning, which is registered using a suitable sensor system 31. The adherence to a certain, specifiable value for the loss due to cleaning forms the control variable used to set the speeds of the particular blowers 21.

Figure 5:
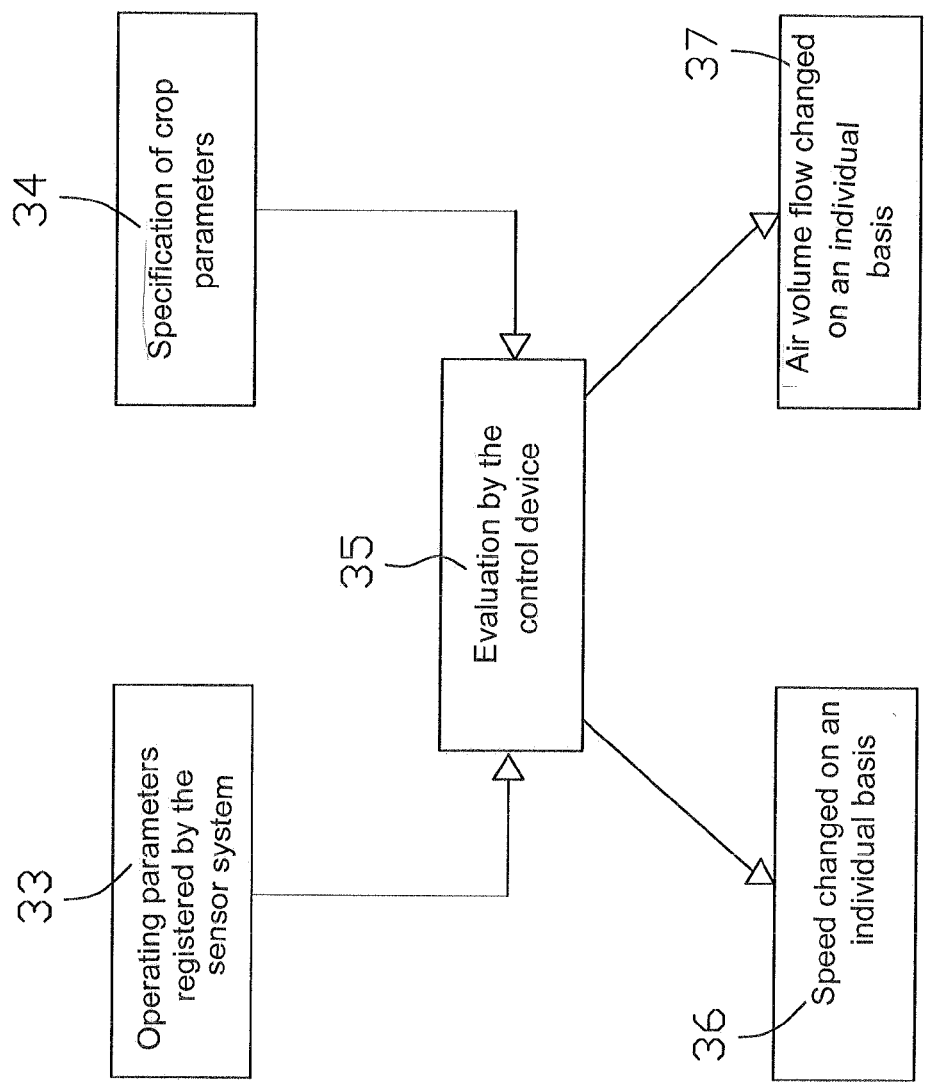
FIG. 5 a flow chart which illustrates a method for controlling the blower system in accordance with the present invention.

FIG. 5 presents a flow chart which schematically visualizes a method for controlling the blower system 17. In a first step 33, the signals which represent operating parameters and are registered permanently by the sensor system 31 are supplied to the control device 31. In a second step 34, crop parameters that can be specified by way of the input unit are forwarded to the control device 32. In a third step 35, the control device 32 continuously evaluates the information that is received, in order to control the blowers 21 independently of one another depending on at least one of the operating parameters that was registered and/or the crop parameters that were input. The speed of the external rotor motor 23 of the particular blower 21 can be changed in a fourth step 36. Alternatively, according to a fifth step 37, an actuator system can be controlled, which actuates orifices at the particular inlet openings and/or the particular first and second outlet openings of the blowers 21, in order to vary the air volume flow that can be output by changing the opening cross section.

In the fifth step 37, in accordance with an identified transverse inclination of the combine harvester, the downhill blower 21 is driven at a higher speed than is the uphill blower 21 since the distribution of the crop quantity on the sieve system shifts downhill, in a known manner. In this manner, the bulk phase forming downhill can be transferred into a fluidized-bed phase by increasing the air volume flow, while the flight phase forming in the crop flow on the uphill side as a result of the decreasing crop quantity can likewise be transferred into a fluidized-bed phase by reducing the speed of the uphill blower 21 accordingly.

The kind of crop, which can be entered by way of the input unit, and the moisture content of the crop are used to adapt the control of the blowers 21, which are driven using single motors, to the particular circumstances. The energy efficiency of the combine harvester can be increased as a result since the blower system 17 can always be acted upon by a drive power that is required in the particular harvesting situation.

It will be understood that each of the elements described above, or two or more together, may also find a useful application in other types of constructions differing from the types described above.

While the invention has been illustrated and described as embodied in a combine harvester, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A combine harvester, comprising:
   a cutting and conveyance device for cutting and conveying crop;
   a threshing device for separating grain from the crop;
   a sieve system arranged in a longitudinal direction of the combine harvester;
   a blower system including at least two blowers which are disposed upstream of said sieve system transversely to the longitudinal direction of the combine harvester; and
   means for controlling said at least two blowers independently of one another to adapt an air volume flow to vary across a width of the sieve system;
   wherein said at least two blowers are disposed coaxially next to one another on a shaft; and
   wherein each of said at least two blowers are driven by separate, individual motors.

2. A combine harvester as defined in claim 1, wherein said blowers are controlled by said means for controlling depending on at least one parameter selected from the group consisting of at least one operating parameter, at least one crop parameter, and both.

3. A combine harvester as defined in claim 1, wherein said means for controlling includes a control device which controls said blowers and is operably connected to a sensor system for registering parameters selected from the group consisting of operating parameters, crop parameters, and both.

4. A combine harvester as defined in claim 1, wherein said means for controlling includes a control device which controls said blowers such that a flow velocity of particular air volume flows of said air volume flow differ across the width of said sieve system.

5. A combine harvester as defined in claim 1, wherein said means for controlling includes a control device which controls said blowers such that particular air volume flows of said air volume flow are adapted depending on a distribution of the crop on said sieve system.

6. A combine harvester as defined in claim 1, wherein said means for controlling includes a control device which controls said blowers depending on a distribution of a layer thickness.

7. A combine harvester as defined in claim 1, wherein said means for controlling includes a control device which controls said blowers depending on a lateral slant registered by a sensor system.

8. A combine harvester as defined in claim 1, wherein said means for controlling includes a control device which controls said blowers depending on an air pressure registered by a pressure measuring device underneath a cleaning device.

9. A combine harvester as defined in claim 1, wherein said means for controlling includes a control device which controls said blowers depending on losses due to cleaning.

10. A combine harvester as defined in claim 1 wherein said separate, individual motors are disposed in a pair arrangement between said blowers.

11. A combine harvester as defined in claim 10, wherein said motors are electric.

12. A combine harvester as defined in claim 11, wherein said electric motors are external rotor motors which are components of said blowers.

13. A combine harvester as defined in claim 1, wherein said blowers have orifices at an inlet opening, which have an adjustable opening width.

14. A combine harvester as defined in claim 1, wherein said blowers have orifices at outlet openings, which have an adjustable opening width.

* * * * *